United States Patent [19]

Kuba et al.

[11] Patent Number: 4,844,388
[45] Date of Patent: Jul. 4, 1989

[54] SUPPORT ARM FOR COMPUTER KEYBOARD

[75] Inventors: Lawrence M. Kuba, Nashua, N.H.; David J. Privitera, Georgetown, Mass.

[73] Assignee: Wang Laboratories, Inc., Lowell, Mass.

[21] Appl. No.: 169,086

[22] Filed: Mar. 17, 1988

Related U.S. Application Data

[63] Continuation of Ser. No. 920,050, Oct. 17, 1986, abandoned.

[51] Int. Cl.⁴ ............................................. G06F 1/00
[52] U.S. Cl. ................................. 248/1 B; 248/1 F; 248/183; 248/231.6
[58] Field of Search ................ 248/646, 660, 663–664, 248/674, 447, 179, 181, 183, 213.2, 214, 225.31, 228, 231.4, 231.6, 240–241, 276, 278, 282, 288.3, 289.1, 349, 1 B, 1 F, 1 C, 1 E; 108/103, 94, 140; 400/682; 312/282

[56] References Cited

U.S. PATENT DOCUMENTS

| | | | |
|---|---|---|---|
| 1,114,921 | 10/1914 | Selstad | 248/278 |
| 1,114,948 | 10/1914 | Walker | 248/278 |
| 1,218,923 | 3/1917 | Bogdanski | 248/278 |
| 1,733,107 | 10/1929 | Ahlberg | 248/278 |
| 1,894,991 | 1/1933 | Hayes | 108/140 |
| 1,910,091 | 5/1933 | Collier | 248/309 |
| 1,948,055 | 2/1934 | Thalhammer | 248/183 |
| 2,328,135 | 8/1943 | Gack | 248/276 |
| 2,535,112 | 12/1950 | Woody | 312/282 |
| 2,842,413 | 7/1958 | Simmons | 248/278 |
| 3,970,792 | 7/1976 | Benham | 248/183 |
| 4,379,429 | 4/1983 | Gubbe | 248/1 B |
| 4,546,708 | 10/1985 | Wilburth | 108/103 |
| 4,562,987 | 1/1986 | Leeds | 248/278 |
| 4,616,798 | 10/1986 | Smeenge | 248/293 |
| 4,706,919 | 11/1987 | Soberalski | 248/281.1 |

FOREIGN PATENT DOCUMENTS

| | | | |
|---|---|---|---|
| 8403573 | 9/1984 | European Pat. Off. | 248/1 B |
| 2717289 | 10/1978 | Fed. Rep. of Germany | 248/231.4 |
| 1053372 | 2/1954 | France | 248/181 |

Primary Examiner—Ramon O. Ramirez
Assistant Examiner—Robert A. Olson
Attorney, Agent, or Firm—Michael H. Shanahan; Kenneth L. Milik

[57] ABSTRACT

A support arm for supporting a computer keyboard on an ordinary desk, the support arm being capable of supporting the keyboard at an ergonomically correct height during use in front of the desk and storing the keyboard out of the way beneath the desk when not in use.

12 Claims, 4 Drawing Sheets

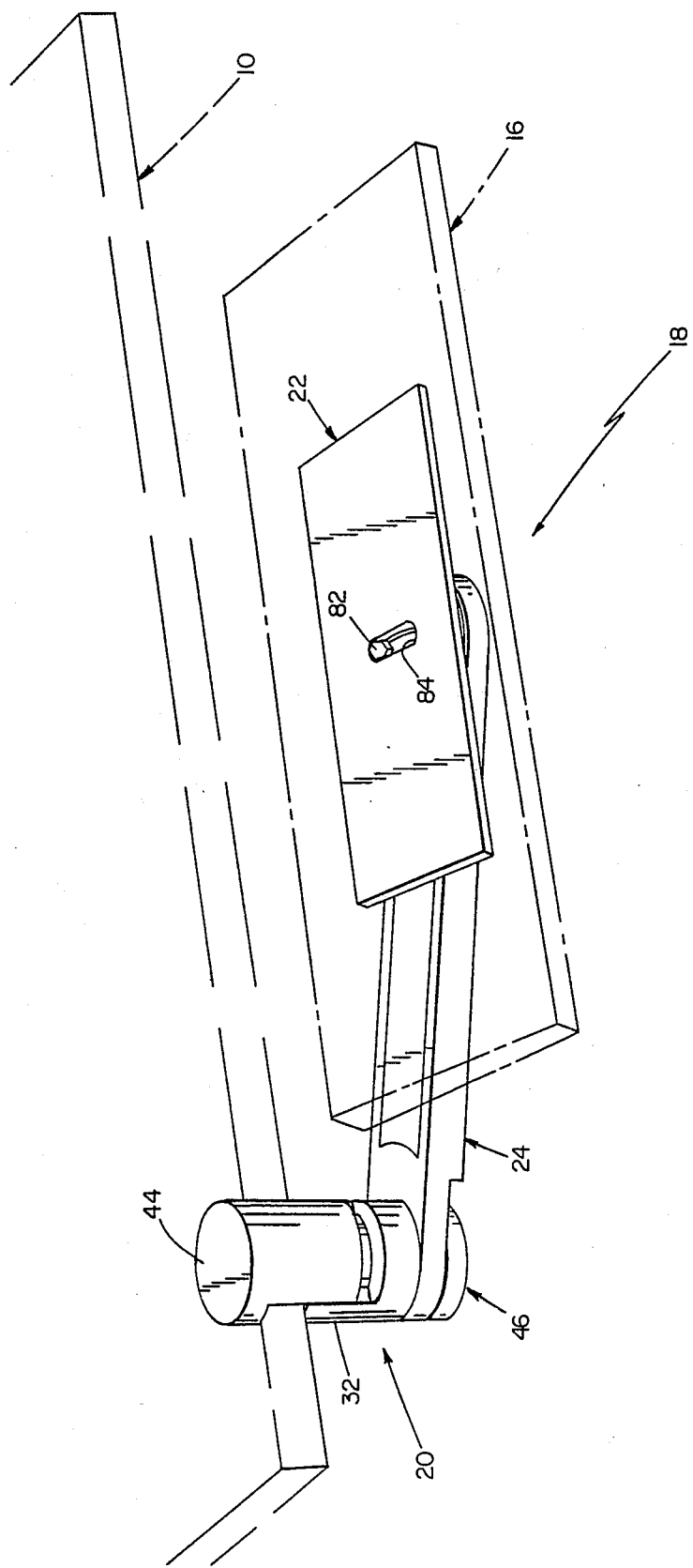

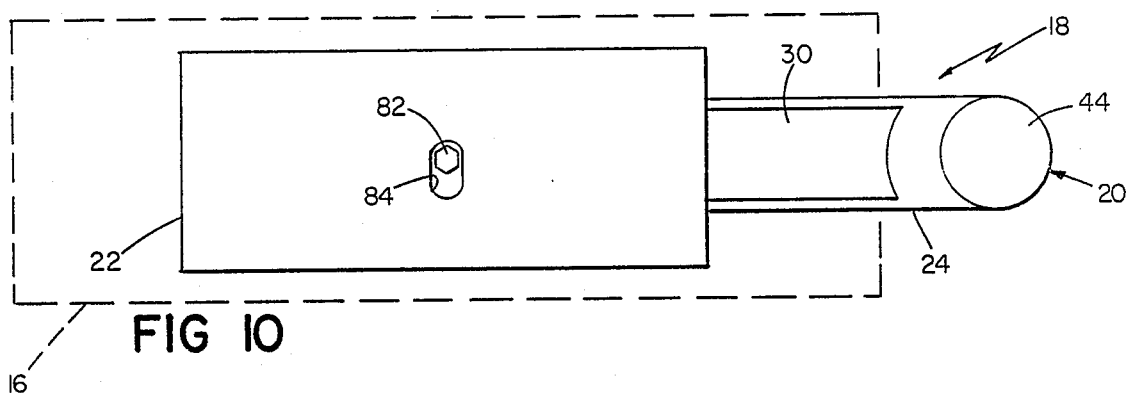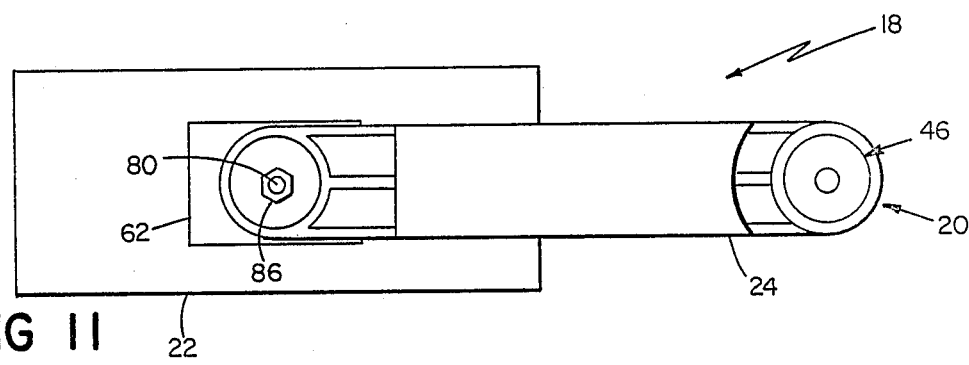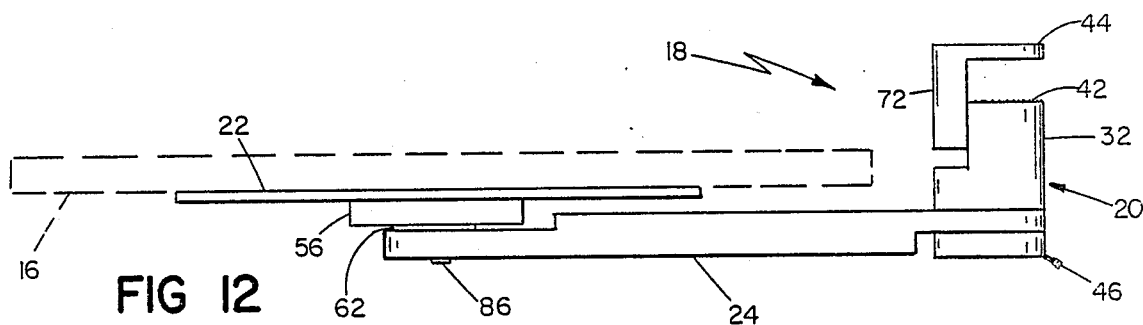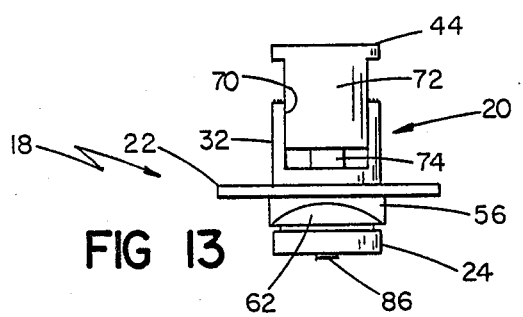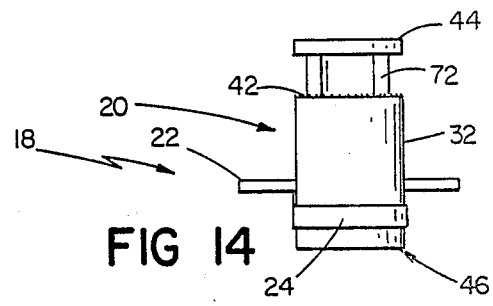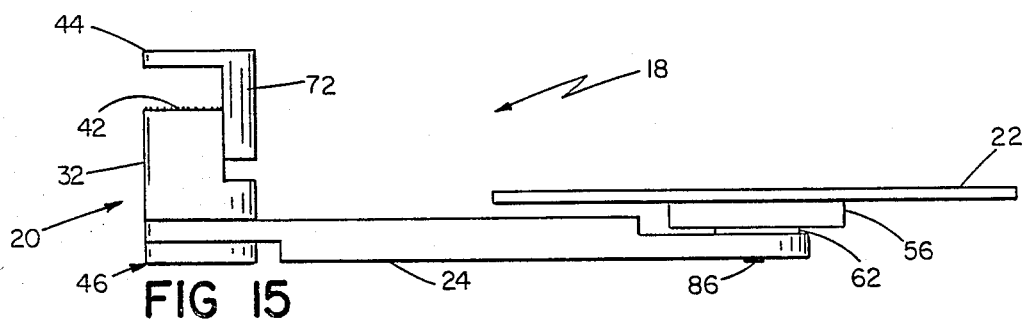

SUPPORT ARM FOR COMPUTER KEYBOARD

This is a continuation of co-pending application Ser. No. 920,050 filed on Oct. 17, 1986, now abandoned.

BACKGROUND OF THE INVENTION

This invention relates to computer keyboards, and particularly to apparatus and furniture on which they are supported. Computer keyboards have become commonplace in the office environment. They are typically detached from the computer monitor and processing unit, and placed on top of the user's desk. In that location they permanently occupy valuable desk space, are at an ergonomically less desirable height, and typically lack any tilt adjustment. Some efforts have been made to improve the ergonomic positioning of the keyboard; e.g., special shelves have been built into computer work stations to lower the keyboard to a height below that of the customary desk surface.

SUMMARY OF THE INVENTION

We have discovered that a computer keyboard can be supported at an ergonomically correct height during use and stored out of the way beneath an ordinary desk when not in use by supporting the keyboard on an arm that pivots about a base clamped to the edge of the desk.

In preferred embodiments, a joint with two degrees of freedom (rotation about vertical and horizontal axes) is provided at the keyboard end of the arm, to provide further ergonomic adjustment of the arm.

The invention frees desktop space for more productive use and improves the appearance of the desk by allowing the keyboard to be stored out of sight. Supported on the arm, the keyboard moves easily and quickly from the stored position beneath the desk to the operating position, and vice versa. A wide range of adjustment is provided in the operating position; the keyboard can be tilted to the most comfortable position, and it can be rotated about the free end of the arm to achieve nearly any relative orientation with the desk. The arm provides a rigid platform for the keyboard even though supported from the desk at only a single location; the rigidity is provided without the complexity of a special shelf or special computer workstation furniture. The arm can be attached rapidly without special tools to nearly all desks and tables, and it can easily be removed or moved to another location.

Other features and advantages of the invention will be apparent from the following description of a preferred embodiment and from the claims.

DESCRIPTION OF THE PREFERRED EMBODIMENT

FIG. 9 is a perspective view of the arm.

FIGS. 10 and 11 are plan views of the arm.

FIGS. 12–15 are elevation views of the arm.

Figure 1:
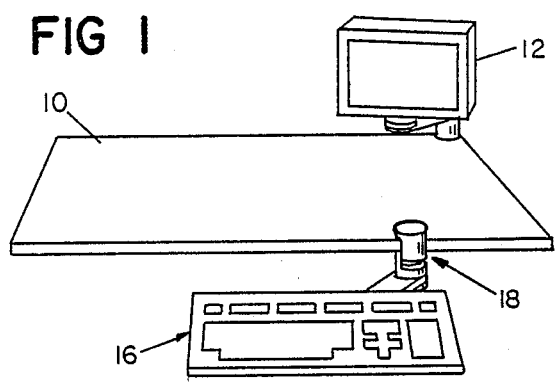
FIG. 1 is a perspective view of a desk with the keyboard arm of the invention attached, showing the keyboard in one possible operating position.
Figure 2:
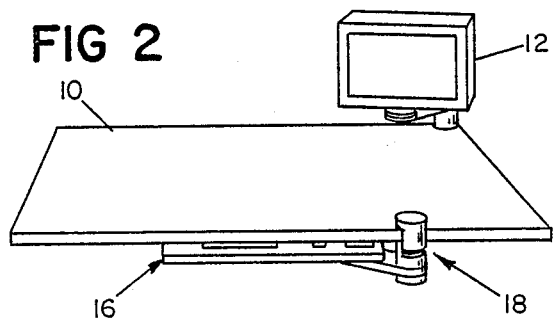
FIG. 2 is a perspective view of the same desk with the keyboard in the stored position.

Turning to FIGS. 1 and 2, there is shown a desk 10 to which are attached a computer video monitor 12 supported on arm 14 and a keyboard 16 supported on arm assembly 18. The keyboard can be moved from an operating position (FIG. 1) to a stored position beneath the desk (FIG. 2).

Figure 3:
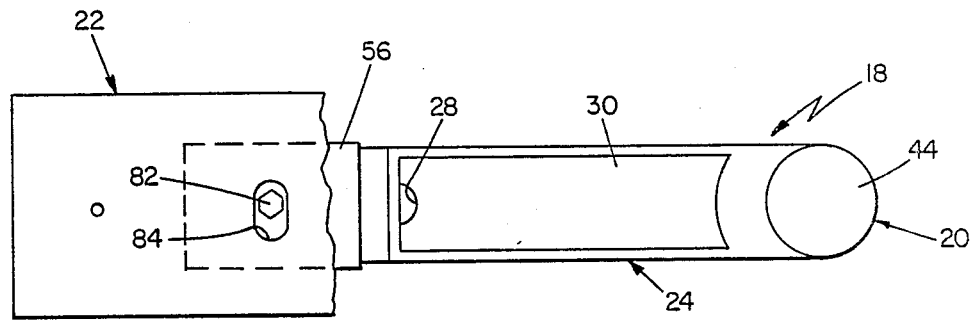
FIG. 3 is a plan view of the arm with the keyboard shown in dashed lines, and with a portion of the keyboard support plate broken away.
Figure 4:
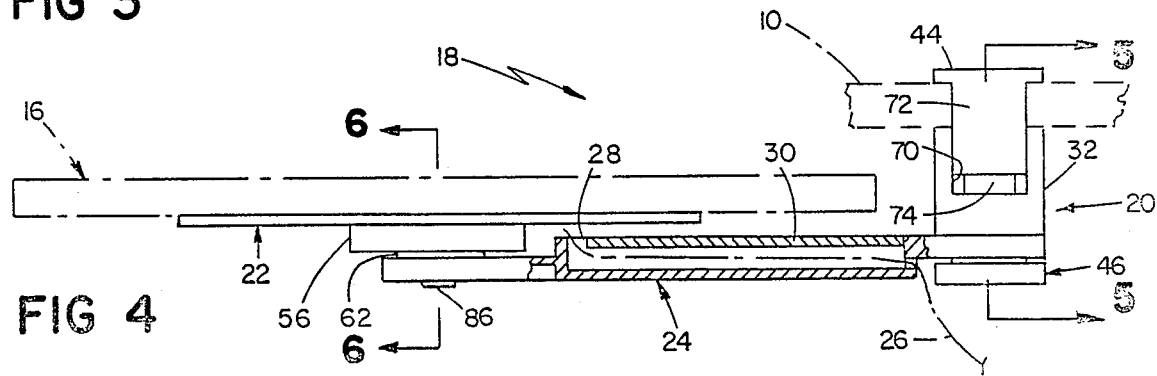
FIG. 4 is an elevation view of the arm with the keyboard and work surface shown in dashed lines, and with a portion of the arm shown in cross section.

Turning to FIGS. 3 and 4, the keyboard arm assembly 18 comprises base 20, which is clamped to the edge of the desk 10, horizontal arm 24 (die cast aluminum) rotatably supported from the base, and keyboard support plate 22 rotatably supported on the free end of the arm. Arm 24 has a hollow core through which the keyboard cable 26 is passed. The cable enters the arm through opening 28 in access panel 30, a polycarbonate sheet held in place by lugs gripping the interior walls of the arm's hollow core. The cable exists through an opening at the base end of the hollow core. Passing the cable through the arm minimizes movement of the cable during keyboard movements.

Figure 5:
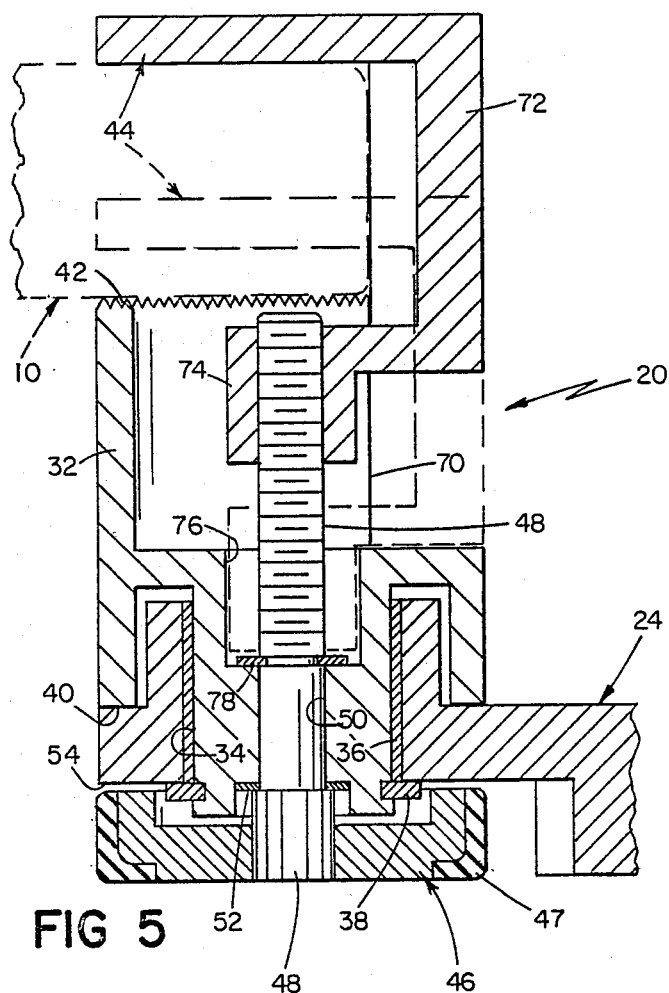
FIG. 5 is a cross-sectional view taken at 5—5 in FIG. 4, showing the pivoting base of the arm (the draft of the various die cast members has been omitted for simplicity).

The pivoting base 20, shown in cross section in FIG. 5, comprises a central member 32 (die cast aluminum) to which arm 24 is rotatably connected at journal 34, which has bushing 36 (660 bronze, not oiled). Retention ring 38 secures arm 24 to the central member 32.

To achieve a rigid support for the keyboard, virtually all perceivable play in arm 24 is eliminated. This is accomplished by providing a substantial height (1.25 inches) to journal 34, and by providing close tolerances between the retention ring 38 and lower surface 40 of the central member, to prevent vertical movement of the arm.

Base 20 is attached to desk 10 by clamping the edge of the desk between adjustable clamping member 44 (die cast) aluminum) and the upper, knurled surface 42 of the central member. The clamping member 44 is adjusted by turning knob 46, which in turn rotates threaded rod 48 (steel), to which the clamping member is threaded. The desk-contact surface of clamping member 44 is provided with a rubber or cork pad (not shown) to prevent damage to the desk. The rod is press fit into knob 46 (die cast aluminum), and passes through bore 50 in central member 32. Knob 46 has rubber grip 47 at its periphery. Central member 32 has a cutout 70 sized to receive the vertical, cylindrical wall 72 of clamping member 44. Base portion 74 of the clamping member, through which rod 48 is threaded, is received by recess 76 in the central member. Retaining ring 78 prevents the whole assembly of rod 48, clamping member 44, and knob 46 from shifting vertically within the central member when the base is not installed on a desk. The shapes of clamping member 44 and central member 32 and length of rod 48 allow adjustment of the clamping member to accommodate desk thicknesses ranging from about 1.9 to 5.1 cm.

Thrust washer 52 bears the upward thrust load of threaded rod 48 and knob 46 on the central member when the base is tightly clamped to the desk. No restraint on the freedom of rotation of arm 24 results from the clamping procedure, because knob 46 is prevented from coming into contact with the arm, by thrust washer 52 and the provision of adequate clearance 54 between the two parts. Arm 24 is free to pivot a full 360° about a vertical axis of rotation.

Figure 6:
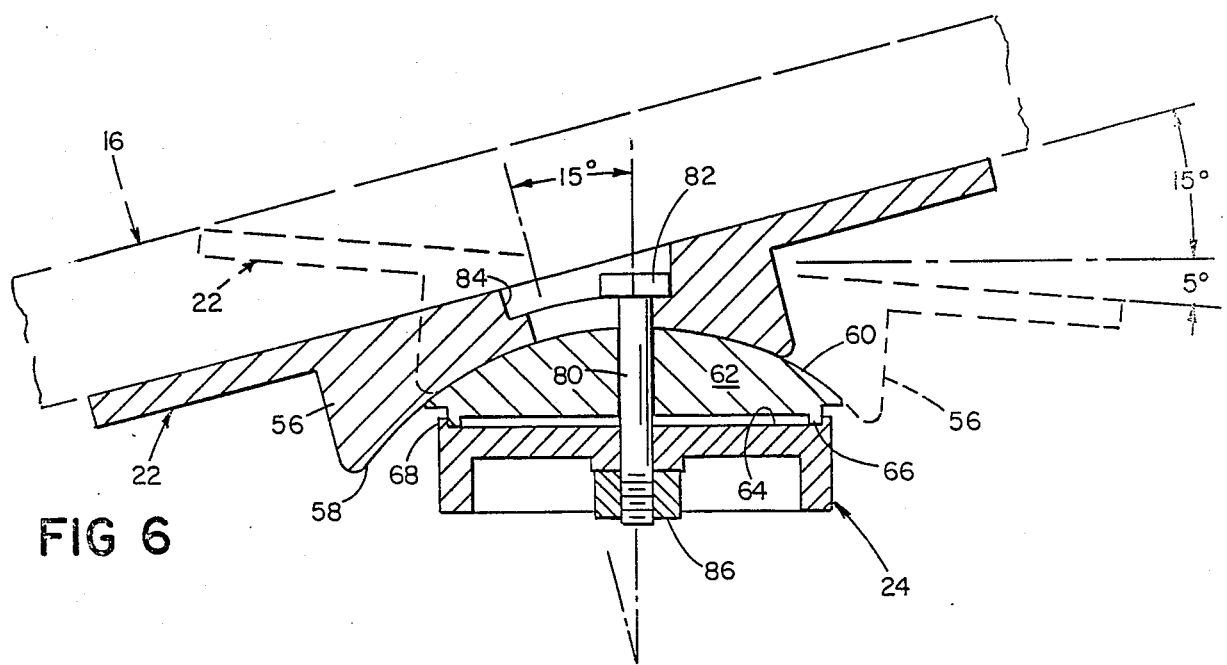
FIG. 6 is a cross-sectional view taken at 6—6 in FIG. 4, showing the keyboard-supporting joint at the free end of the arm.

The rotatable joint at the keyboard end of the arm assembly is shown in cross section in FIG. 6. Keyboard support plate 22 (molded structural foam) has base 56 with cylindrical surface 58, which mates with matching cylindrical surface 60 on intermediate member 62 (injection molded acetal), which rotates, in turn, on bearing surface 64 at the end of arm 24. Member 62 has a horizontal bearing surface provided by narrow annular projection 66, which contacts horizontal bearing surface 64 on the arm just inside annular lip 68. Bolt 80 clamps the three members (base 56, intermediate member 62, and arm 24) together. The head 82 of the bolt travels in slot 84 in keyboard support plate 22 (FIGS. 3 and 6). The slot prescribes the extent to which the keyboard can be tilted.

The keyboard can be quickly tilted or rotated into a new position, and retain that position without further adjustment. This is accomplished by using dissimilar plastics for base 56 and member 62, one material being hard, and the other slippery. The members making up the joint are tightened by nut 86 (with self-locking insert) and bolt 80 just tightly enough to assure that there is enough friction between base 56, intermediate member 62, and bearing surface 64 to keep the keyboard in its selected orientation. The nut is not adjusted so tightly, however, as to prevent adjustment of the relative positions of these members. The keyboard can be tilted about a horizontal axis of rotation from 15° forward to 5° backward, and it can be rotated about a vertical axis of rotation a full 360°.

Figure 7:
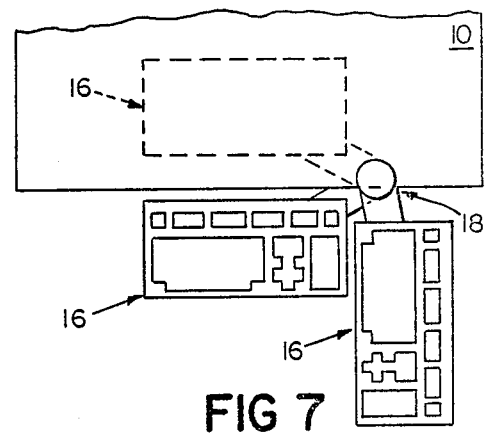
FIGS. 7 and 8 are diagrammatic views showing various possible positions of the arm and keybaord.
Figure 8:
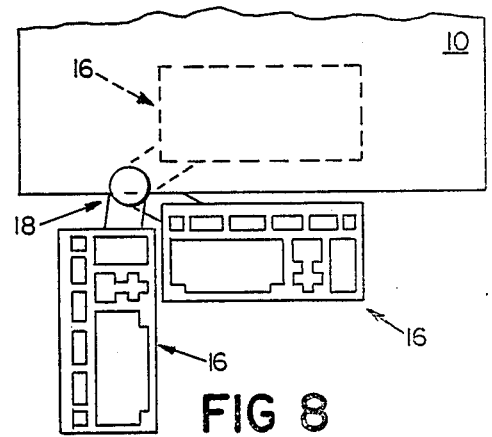

Turning to FIGS. 7 and 8, it can be seen that the ability of the keyboard to be rotated a full 360° with respect to arm 24, and the arm, in turn, to be rotated a full 360° with respect to the base, is what permits the keyboard to be positioned at any chosen angular orientation with respect to the desk, no matter whether installed at the left or right of the user.

Though not shown in the figures, it is also possible to install the base near the edge of a desk so that the arm can be swung a full 180° to allow the keyboard to be shared by a neighbor, who could also move the video monitor arm so that the monitor, too, could be shared.

Operation of the arm assembly is quite simple. The arm assembly is installed on a desk by turning knob 46 to open the clamp to the desk thickness, pushing the clamp over the edge of the desk, and tightening knob 46 until the clamp is secured to the desk. The keyboard is then installed on the support plate 22 by screws passing through holes (not shown) in the support plate. An adhesively-secured adaptor plate could be used to install keyboards not having attachment screws in the proper locations.

When the keyboard is not in use it is tucked under the desk surface, out of sight. There is ordinarily more than adequate vertical space for the arm and keyboard to reside under the desk without interfering with the legs of the user. To use the keyboard, the user simply reaches under his desk and pulls the keyboard out to the desired operating position. No further adjustments are needed.

OTHER EMBODIMENTS

Other embodiments of the invention are within the following claims. For example, an optional surface for resting the user's palms in front of the keyboard can be provided by sandwiching a palm-rest plate between the keyboard and support plate 22, with the palm-rest plate extending outward in front of the keyboard. Also, protruding pins could be substituted for the knurled desk-gripping surface of the clamp, to provide a more secure grip to the underside of the desk.

We claim:

1. Computer keyboard apparatus comprising
a computer keyboard,
an ordinary desk or table,
a support arm attached to said desk and keyboard and supporting said keyboard from said desk, said support arm comprising
a base for detachably securing said support arm to said ordinary desk,
said base having a clamping element for clamping said base to the edge of said desk,
said clamping element having upper and lower gripping elements for gripping the upper surface and under surface, respectively, of said ordinary desk, and a tightening mechanism for varying the separation of said upper and lower gripping elements to accomodate different desk thicknesses and to tighten said gripping elements against said upper and under surfaces of said desk,
an arm member extending horizontally from said base at a height below the level of the underside of said desk, said arm member comprising a keyboard end for supporting said keyboard,
a keyboard support plate at the keyboard end of said arm member, and
a first rotatable joint at said base with means for permittig rotation of said arm member about a first vertical axis, said rotation being sufficient to move said arm member from a keyboard-stored position in which said keyboard is positioned beneath said desk to an operating position in which said keyboard is exposed in front of said desk.

2. The support arm of claim 1 further comprising a second rotatable joint at the keyboard end of said arm member with means for permitting rotation of said keyboard about a second vertical axis.

3. The support arm of claim 2 wherein said second rotatable joint includes means for rotating said keyboard about a horizontal axis of rotation to permit tilting the keyboard to a desired position.

4. The support arm of claim 1 further comprising a first opening in said support arm at the outer end of said arm for introducing the cable of said keyboard into the interior of said support arm, said first opening being located so that said keyboard covers said opening and cable entering said opening and further comprising a second opening at the inner end of said arm, said second opening being underneath said arm so as to conceal from view cable exiting said arm through said second opening.

5. The support arm of claim 1 wherein said upper gripping element comprises
an upper clamping member with a surface for gripping the upper surface of said desk, wherein said lower gripping element comprises a central member with a surface for gripping the undersurface of said desk, wherein said thightening mechanism comprises a threaded rod to which said upper member is threaded, said threaded rod extending vertically through said central member and, an adjustment knob connected to said threaded rod and providing a means for tightening or loosening the grip of said clamping and central members on said desk.

6. The support arm of claim 5 wherein means are provided for supporting said arm member with respect to the upper clamping member and the central member of said base so that said support arm is free to rotate about said first vertical axis even when said base is tightly clamped to said desk.

7. The support arm of claim 6 wherein said threaded rod and first vertical axis are coaxial.

8. A support arm for installing a computer keyboard on an ordinary desk or table, comprising a base for detachably securing said support arm to said ordinary desk,
said base having a clamping means for clamping said base to the edge of said desk, an arm member extending horizontally from said base at a height below the level of the underside of said desk, a keyboard support plate at the keyboard end of said arm member, a first rotatable joint at said base with means for permitting rotation of said arm member about a first vertical axis, said rotation being sufficient to move said arm member from a keyboard-stored position in which said keyboard is positioned beneath said desk to an operating position in which said keyboard is exposed in front of said desk, and a second rotatable joint at the keyboard end of said arm member with means for permitting rotation of said keyboard about a second vertical axis, said second rotatable joint including means for rotating said keyboard about a horizontal axis of rotation to permit tilting the keyboard to a desired position, said second rotatable joint comprising a member fixed to the underside of said keyboard support plate and having a first cylindrical surface, an intermediate member having a second cylindrical surface adapted to mate with said first cylindrical surface, said two cylindrical surfaces being adapted to provide said tilting rotation of said keyboard, a first horizontal bearing surface on said arm member, a second horizontal bearing surface on said intermediate member and adapted to mate with said first horizontal bearing surface, said two bearing surfaces being adapted to provide said rotation about a second vertical axis, and fastening means for clamping together said cylindrical and horizontal surfaces.

9. The support arm of claim 8 wherein said cylindrical surfaces are on members constructed of sufficiently different plastic material that said keyboard can be tilted to a desired position and retain that position without further tightening or other adjustment of said joint.

10. The support arm of claim 8 wherein said fastening means is a bolt which is passed through said members.

11. A support arm for installing a computer keyboard on an ordinary desk or table, comprising a base for detachably securing said support arm to said ordinary desk, said base having a clamping means for clamping said base to the edge of said desk, an upper clamping member with a surface for gripping the upper surface of said desk, a central member with a surface for gripping the undersurface of said desk, a threaded rod to which said upper member is threaded, said threaded rod extending vertically through said central member, and an adjustment knob connected to said threaded rod and providing means for tightening or loosening the grip of said clamping and central members on said desk, an arm member extending horizontally from said base at a height below the level of the underside of said desk, a keyboard support plate at the keyboard end of said arm member, a first rotatable joint at said base with means for permitting rotation of said arm member about a first vertical axis, said rotation being sufficient to move said arm member from a keyboard-stored position in which said keyboard is positioned beneath said desk to an operating position in which said keyboard is exposed in front of said desk, and means for supporting said support arm with respect to the other members of said base so that said support arm is free to rotate about said first vertical axis even when said base is tightly clamped to said desk, said threaded rod and first vertical axis being coaxial, said support arm and central member having mating cylindrical journals, said adjustment knob being positioned beneath said arm, and said threaded rod extending through the interior of the journal of said central member.

12. The support arm of claim 11 wherein said central member and support arm include means for concealing said journal and threaded rod.

* * * * *